(12) United States Patent
Doglioni Majer

(10) Patent No.: US 12,042,081 B2
(45) Date of Patent: Jul. 23, 2024

(54) FILTER HOLDER FOR COFFEE MACHINES

(71) Applicant: CARIMALI S.P.A., Bergamo (IT)

(72) Inventor: Andrea Doglioni Majer, Bergamo (IT)

(73) Assignee: CARIMALI S.P.A., Bergamo (IT)

( * ) Notice: Subject to any disclaimer, the term of this patent is extended or adjusted under 35 U.S.C. 154(b) by 731 days.

(21) Appl. No.: 17/273,406

(22) PCT Filed: Sep. 5, 2019

(86) PCT No.: PCT/IB2019/057482
§ 371 (c)(1),
(2) Date: Mar. 4, 2021

(87) PCT Pub. No.: WO2020/049495
PCT Pub. Date: Mar. 12, 2020

(65) Prior Publication Data
US 2021/0321814 A1 Oct. 21, 2021

(30) Foreign Application Priority Data
Sep. 6, 2018 (IT) .................. 102018000008404

(51) Int. Cl.
| *A47J 31/06* | (2006.01) |
| *A47J 31/44* | (2006.01) |
| *A47J 31/46* | (2006.01) |
| *A47J 31/52* | (2006.01) |
| *A47J 31/56* | (2006.01) |
| *A47J 42/40* | (2006.01) |

(52) U.S. Cl.
CPC ......... *A47J 31/0657* (2013.01); *A47J 31/446* (2013.01); *A47J 31/461* (2018.08); *A47J 31/468* (2018.08); *A47J 31/52* (2013.01); *A47J 31/56* (2013.01); *A47J 42/40* (2013.01)

(58) Field of Classification Search
CPC ...... A47J 42/40; A47J 31/468; A47J 31/0657; A47J 31/461
See application file for complete search history.

(56) References Cited

U.S. PATENT DOCUMENTS

| 4,787,299 | A | * | 11/1988 | Levi | ...................... | A47J 31/402 |
| | | | | | | 99/295 |
| 6,439,105 | B1 | * | 8/2002 | Ford | ...................... | A47J 31/06 |
| | | | | | | 99/290 |
| 2003/0129286 | A1 | * | 7/2003 | Knepler | ................ | A47J 31/525 |
| | | | | | | 426/231 |

FOREIGN PATENT DOCUMENTS

| BR | 202012017899 U2 | * | 10/2015 |
| ES | 1068358 U | * | 7/2008 |

(Continued)

OTHER PUBLICATIONS

International Search Report and written opinion issued by the EPO on Dec. 17, 2019 for PCT/IB2019/057482.

*Primary Examiner* — Thien S Tran

(57) ABSTRACT

The invention concerns filter holder for coffee machines comprising a substantially cylindrical body, inside which a perforated filter (14) is provided, the cylindrical body forming a cup-shaped container (12) for containing coffee powder, the filter holder (10) further comprising identification means for identifying the type of filter holder (10), characterized in that said identification means for identifying the type of filter holder (10) comprise at least one diametral magnet whose diametral orientation can be detected outside the filter holder (10). The invention further concerns a coffee machine and a grinder for coffee beans usable with the filter holder (10).

14 Claims, 2 Drawing Sheets

(56) References Cited

FOREIGN PATENT DOCUMENTS

| ES | 1 068 358 | 10/2008 |
|----|-----------|---------|
| IT | 20 100 009 | 8/2011 |

* cited by examiner

FILTER HOLDER FOR COFFEE MACHINES

This application is a U.S. national stage of PCT/EP2019/057482 filed on 5 Sep. 2019 which claims priority to and the benefit of Italian Application No. 102018000008404 filed on 6 Sep. 2018 the contents of which are incorporated herein by reference in their entireties.

FIELD OF THE INVENTION

The invention concerns a filter holder for coffee machines.

The invention further concerns a coffee machine usable with the improved filter holder.

The invention further concerns a grinder for coffee beans usable with the improved filter holder.

KNOWN PRIOR ART

As it is known, the filter holders for coffee machines consist of an essentially cylindrical body, inside which a filter is provided, the cylindrical body constituting a cup-shaped container for containing coffee powder.

The cup-shaped container has a lower truncated conical body provided with a single or double spout for the outflow of the coffee infusion.

The cup-shaped container further has two opposite fins adapted to be engaged, in a known way, with a respective hooking element provided in the coffee machine or in the grinder.

Embodiments, wherein it is provided to equip the filter holder with one or more magnets so that to allow a coffee machine, equipped with appropriate magnetic reading sensors, to recognize the type of filter holder inserted and to behave consequently, are also known.

For example, the document U.S. Pat. No. 6,439,105 describes a coffee machine operable in different modes, said modes being variable depending on the polarity of a magnet housed in the filter holder and detected by the machine itself in order to deliver different types of beverages.

In particular, the filter holder comprises two magnets spaced from each other and arranged so that to have different polarity. Each magnet is arranged on a respective handle of the filter holder.

The magnet arranged on the first handle has a determined magnetic orientation; on the second handle, the magnet has an orientation in which the magnetic North and South poles are opposite those of the first magnet.

The filter holder can further comprise writing and/or logos or other indications to help the user and/or bartender to identify the type of beverage desired.

The coffee machine described in the document U.S. Pat. No. 6,439,105 further comprises a magnetic sensor, for example a Hall effect sensor.

Depending on the orientation with which the filter holder is mounted on the coffee machine, the magnetic sensor only detects one of the two magnets.

Depending on the magnetic polarity detected, the coffee machine delivers a beverage rather than another.

It is clear that each filter holder must bear at least two magnets in order to distinguish the filter holders from each other in the case of document U.S. Pat. No. 6,439,105.

Moreover, the magnets can not be placed near each other because, in this case, the opposite polarities would be countered, thus giving a signal that cannot be read by the Hall effect sensor.

The document U.S. Pat. No. 4,787,299 describes a coffee machine operable in variable modes depending on the capacity of the filter holder used. The machine is controlled by means of magnets positioned on the filter holder; the machine delivers a different quantity of water depending on the number of magnets present on the filter holder.

Also in the case of document U.S. Pat. No. 4,787,299, several magnets in different positions are necessary for controlling the machine.

A problem of the known art is thus to identify the type of filter holder with the smallest possible number of magnets.

An object of the present invention is thus to overcome the drawbacks mentioned above, by means of a filter holder that can be combined with a coffee machine and/or coffee grinder and that can be recognized by the device to which it is applied, also using only one magnet.

A further object of the present invention is to achieve the results mentioned above in a simple and economic way.

BRIEF SUMMARY OF THE INVENTION

The invention thus suggest to achieve the aforesaid objects by means of a filter holder for coffee machines comprising a substantially cylindrical body, inside which a perforated filter is provided, the cylindrical body forming a cup-shaped container for containing coffee powder, the filter holder further comprising identification means for identifying the type of filter holder, characterized in that said identification means for identifying the type of filter holder comprise at least one diametral magnet whose diametral orientation can be detected outside the filter holder.

The invention further comprises a coffee machine comprising an electronic control unit configured for controlling the operations of the machine, wherein the aforesaid electronic control unit is connected to at least one sensor configured for detecting a value of the magnetic field generated by at least one diametral magnet placed aboard a filter holder and for selecting an operating program of the machine depending on the value of the magnetic field detected by the sensor.

The invention further comprises a coffee machine comprising an electronic control unit configured for controlling the operations of the grinder, wherein the aforesaid electronic control unit is connected to at least one sensor configured for detecting a value of the magnetic field generated by at least one diametral magnet placed aboard a filter holder and for selecting an operating program of the grinder depending on the value of the magnetic field detected by the sensor.

Further characteristics of the invention can be deduced from the dependent claims.

BRIEF DESCRIPTION OF THE FIGURES

Further characteristics and advantages of the invention will become more evident in the light of the following detailed description with the aid of the accompanying tables of drawings, in which.

DETAILED DESCRIPTION OF SOME EMBODIMENTS OF THE PRESENT INVENTION

The invention will now be described with initial reference to FIG. 3, in which a component, known per se, of the present invention is depicted, i.e. a diametral magnet 20.

As it is known, diametral magnets 20 are magnetic disks that are configured to have a N-S polarity aligned along a diameter of the magnetic disk itself rather than along an axis passing through the center of the disk and perpendicular to the plane on which the disk is lying.

Figure 3:
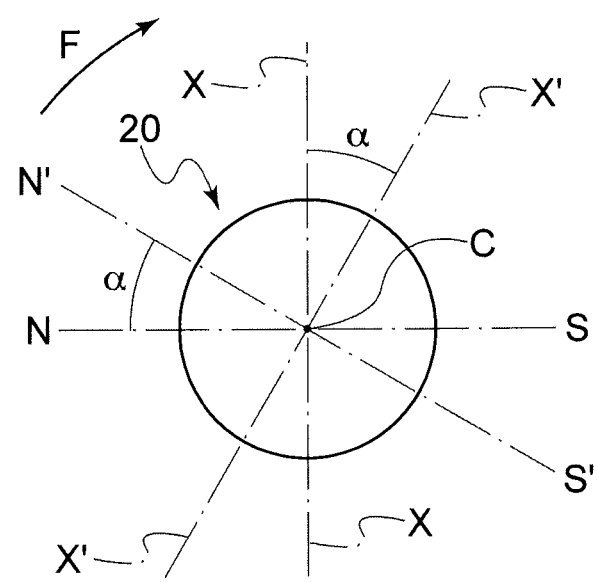
FIG. 3 shows a diametral magnet that can be used in the filter holder of FIGS. 1 and 2.

If for example the diametral magnet 20 of FIG. 3 is rotated in direction of the arrow F by an angle α around an axis passing through the center C of the disk and perpendicular to the plane on which the disk is lying, so that the diameter denoted by X-X in FIG. 3 is brought to the position denoted by X'-X', the N-S poles of the diametral magnet rotate by a corresponding angle, moving to the position denoted by N'-S' in FIG. 3.

Figure 1:
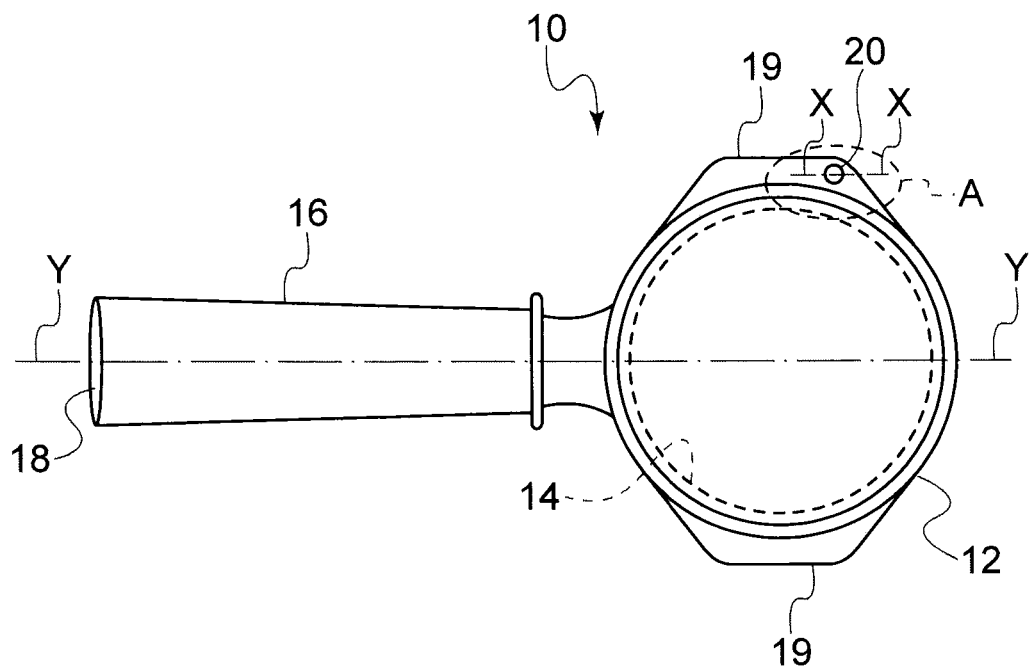
FIG. 1 shows, in a view from above, a filter holder according to an embodiment of the invention.

FIG. 1 shows, in a view from above, a filter holder according to an embodiment of the invention, generally denoted by the numerical reference 10.

Firstly, the filter holder 10 has an essentially cylindrical body, inside which a perforated filter holder 14 is provided, the cylindrical body constituting a cup-shaped container 12 for containing coffee powder.

The cup-shaped container 12 has a lower truncated conical body provided with a single or double spout for the outflow of the coffee infusion (not depicted for simplicity) and provided with a handle 16.

A visual indicator 18, for example equipped with a different color for each type of filter holder 10 so that to visually distinguish between the different filter holders according to the modes shown below, can be provided at an end of the handle 16.

In other words, a determined filter holder 10 can be provided with one or more diametral magnets 20, 20' and can be identified by means of a respective visual indicator 18 related to the orientation of the diametral magnets 20, 20'.

Each diametral magnet 20, 20' has N-S magnetic poles aligned along a diameter of the magnet 20, 20' itself and can be mounted aboard the filter holder 10 with a specific magnetic orientation with respect to a longitudinal axis Y-Y of the filter holder 10 itself. The cup-shaped container 12 further has two opposite fins 19 adapted to engage, in a known way for example with a bayonet mount, with a respective hooking element provided in the coffee machine or in the grinder.

According to an aspect of the invention, a diametral magnet 20 having a determined magnetic orientation is incorporated in one of the fins 19 of the filter holder 10.

Figure 2:
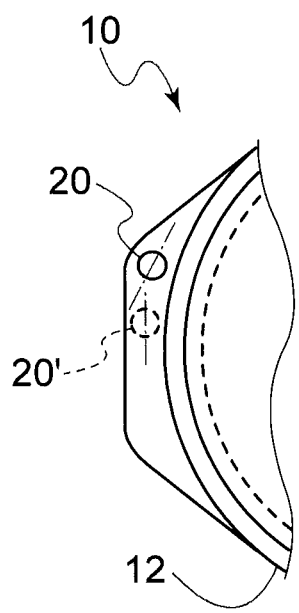
FIG. 2 shows a detail of the filter holder of FIG. 1.

FIG. 2 shows a detail of the filter holder of FIG. 1, in which an alternative embodiment of the invention is depicted which provides for a first diametral magnet 20 having a determined magnetic orientation, and a second diametral magnet 20' having a different magnetic orientation.

The filter holder 10 described is configured to interact with a magnetic sensor 30 placed aboard a coffee machine or aboard a grinder.

The value of the magnetic field detected by the magnetic sensor 30 can depend on the orientation of the diametral magnet 20, 20' placed aboard the filter holder 10 with respect to a longitudinal axis Y-Y of the filter holder 10 itself.

Thus, each filter holder 10 can be identified by a coffee machine or by a grinder and simultaneously identified by an operator by means of a respective visual indicator 18 related to the orientation of the diametral magnets 20, 20'.

This way, the operator can use, from time to time and depending on the need, different filter holders, each containing a specific quality and/or blend of coffee or decaffeinated coffee, all as better shown below.

The magnetic sensor 30 can be, for example, a Hall sensor.

According to an alternative embodiment of the invention, the magnetic orientation of the diametral magnets 20, 20' placed aboard the filter holder 10 can be varied manually.

Figure 4:
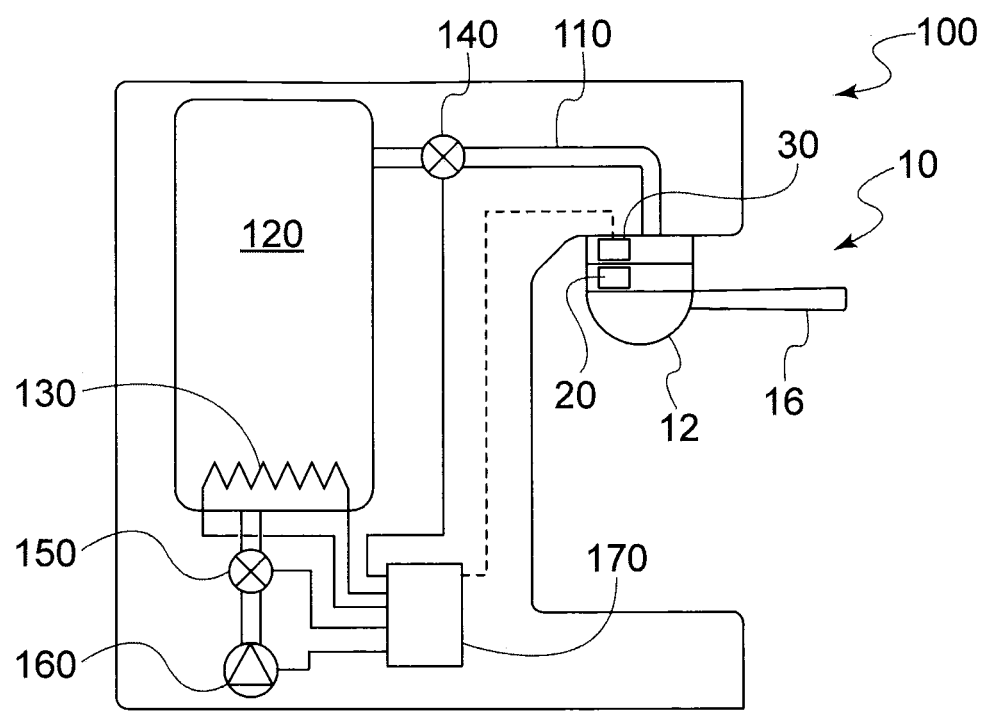
FIG. 4 shows a coffee machine configured to be used with the filter holder of FIGS. 1-3.

FIG. 4 shows a coffee machine 100 configured to be used with the filter holder of FIGS. 1-3.

The machine 100 provides an electronic control unit 170 configured for controlling the operations of the machine 10.

In particular, the electronic control unit 170 is connected to an electric resistance 130 contained inside a boiler 120 and is further connected to a pump 160.

The water inflowing and outflowing of the boiler 120 can further be controlled by the electronic control unit 170 by controlling the inlet valve 150 and the outlet valve 140.

The machine 100 further comprises at least one sensor 30 configured for detecting a value of the magnetic field generated by at least one diametral magnet 20, 20' placed aboard the filter holder 10 and for selecting an operating program of the machine depending on the value of the magnetic field detected by the sensor 30.

During the operations of the coffee machine 100, by coupling a determined filter holder 10 with the machine 100 so that to prepare one or more doses of a beverage, the electronic control unit 170, by reading the specific orientation of the diametral magnet 20, 20' placed aboard the filter holder by means of the magnetic sensor 30 aboard the machine 100 itself, is able to recognize the specific filter holder 10 and can control the operations of the machine 100 by acting on parameters such as the volume, flow rate, temperature and pressure of the water or other depending on the type of beverage desired.

In particular, the electronic control unit 170 is connected to an electric resistance 130 contained inside a boiler 120, for controlling the water temperature depending on the type of filter holder 10 detected by the sensor 30.

Moreover, the amount of water inflowing and outflowing of the boiler 120 can be controlled by the electronic control unit 170, which is connected to a pump 160, by controlling the inlet valve 150 and the outlet valve 140, depending on the type of filter holder 10 detected by the sensor 30.

Figure 5:
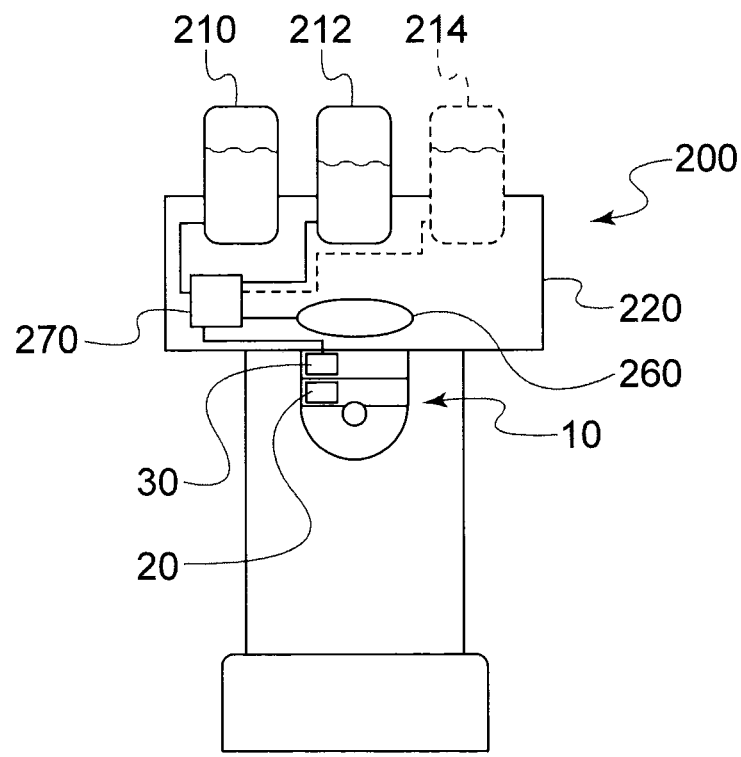
FIG. 5 shows a coffee grinder configured to be used with the filter holder of FIGS. 1-3.

FIG. 5 shows a coffee grinder 200 configured to be used with the filter holder of FIGS. 1-3.

The grinder 200 comprises a body 220 on which at least two coffee bean containers 212, 214 are mounted.

The coffee bean containers 212, 214 can each contain a different type of coffee (i.e.: *Arabica, Robusta*, etc.).

In an embodiment of the invention, additional coffee bean containers 216 can be provided.

The grinder 200 further comprises an electronic control unit 270 configured for controlling the operations of the grinder 200 itself.

The coffee bean containers can each be provided with a movable element (known per se in the art and not depicted for simplicity) to allow the outflow of the beans to be ground towards a grinding member 260, the opening and closing of said movable elements being controllable by the intervention of the electronic control unit 270.

The grinder 200 further comprises at least one sensor 30 configured for detecting a value of the magnetic field generated by at least one diametral magnet 20, 20' placed aboard the filter holder 10 and for selecting an operating program of the grinder 200 depending on the value of the magnetic field detected by the sensor 30.

In the operations of the grinder 200, by coupling a determined filter holder with the grinder 200, the electronic control unit 270 aboard the grinder 200 is able to recognize the specific filter holder 10 and can determine the granulometry, dose and degree of compression of the coffee powder to provide to the filter holder 10, by reading the specific orientation of the diametral magnet 20, 20' placed aboard the filter holder by means of the magnetic sensor 30 aboard the grinder 200 itself.

In particular, depending on the filter holder 10 detected, the electronic control unit 270 aboard the grinder 200 can act on one or more movable elements which allow the coffee beans to pass from the respective container towards the grinding member 260, thus determining the quantity and type of coffee to be ground.

Obviously, modifications or improvements may be added to the invention as described as a result of contingent or particular motivations, but without deviating from the scope of the invention claimed hereunder.

The invention claimed is:

1. Filter holder (10) for coffee machines, comprising a handle (16) connected to a substantially cylindrical body, inside which a perforated filter (14) is provided, the cylindrical body forming a cup-shaped container (12) for containing coffee powder and being provided with engagement fins (19), the filter holder (10) further comprising identification means for identifying a type of filter holder (10), characterized in that said identification means for identifying the type of filter holder (10) comprise at least one diametral magnet (20) whose magnetic orientation is detected outside the filter holder (10) and wherein a magnetic orientation of a single one of said at least one diametral magnet (20) identifies the type of said filter holder.

2. Filter holder (10) according to claim 1, wherein at least one diametral magnet (20) having a determined magnetic orientation is placed at one of the engagement fins (19).

3. Filter holder (10) according to claim 1, wherein a visual indicator (18) related to the orientation of the diametral magnets (20,20') is provided on one end of the handle (16).

4. Filter holder (10) according to claim 1, wherein the magnetic orientation of the at least one diametral magnet (20) aboard the filter holder is changed manually.

5. Filter holder (10) according to claim 2, wherein said diametral magnet (20) is a disk-shaped magnet (20) having a N-S polarity aligned along a diameter of the magnetic disk itself.

6. Coffee machine (100) comprising an electronic control unit (170) configured for controlling operations of the machine (10), characterized in that the electronic control unit (170) is connected to at least one sensor (30) configured for detecting a value of a magnetic field generated by at least one diametral magnet (20) placed aboard a filter holder (10) according to claim 1 and combinable with the machine (100), for selecting an operating program of the machine (100) depending on the value of the magnetic field detected by the sensor (30) wherein the value of the magnetic field detected by the sensor (30) depends on the magnetic orientation of a single one of said at least one diametral magnet (20).

7. Coffee machine (100) according to claim 6, wherein the electronic control unit (170) is connected to an electric resistance (130) contained inside a boiler (120) for controlling water temperature depending on the type of filter holder (10) detected by the sensor (30).

8. Coffee machine (100) according to claim 6, wherein a quantity of water inflowing and outflowing of the boiler (120) is controlled by the electronic control unit (170) that is connected to a pump (160), by controlling an inlet valve (150) and an outlet valve (140), depending on the type of filter holder (10) detected by the sensor (30).

9. Coffee machine (100) according to claim 6, wherein said diametral magnet (20) is a disk-shaped magnet (20) having a N-S polarity aligned along a diameter of the magnetic disk itself.

10. Coffee grinder (200) comprising an electronic control unit (270) configured for controlling operations of the grinder (200), characterized in that the electronic control unit (270) is connected to at least one sensor (30) configured for detecting a value of a magnetic field generated by at least one diametral magnet (20) placed aboard the filter holder (10) according to claim 1 and combinable with the grinder (200), and for selecting an operating program of the grinder (200) depending on the value of the magnetic field detected by the sensor (30).

11. Coffee grinder (200) according to claim 10, wherein, depending on the type of filter holder (10) detected by the magnetic sensor (30), the electronic control unit (270) aboard the grinder (200) acts on one or more of movable members allowing passage of coffee beans from a relative container to a grinding member (260), therefore determining quantity and type of coffee to be ground.

12. Coffee grinder (100) according to claim 10, wherein said diametral magnet (20) is a disk-shaped magnet (20) having a N-S polarity aligned along a diameter of the magnetic disk itself.

13. Filter holder (10) according to claim 3, wherein the visual indicator (18) provides a different color for each said type of filter holder.

14. Coffee machine (100) according to claim 6, wherein the operating program includes parameters including flow rate, temperature and water pressure.

* * * * *